US010006508B2

United States Patent
Cho et al.

(10) Patent No.: US 10,006,508 B2
(45) Date of Patent: Jun. 26, 2018

(54) METHOD OF CONTROLLING CLUTCH OF VEHICLE

(71) Applicant: HYUNDAI MOTOR COMPANY, Seoul (KR)

(72) Inventors: Sung Hyun Cho, Yongin-si (KR); Hwan Hur, Seoul (KR); Ju Hyun Nam, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 364 days.

(21) Appl. No.: 15/040,072

(22) Filed: Feb. 10, 2016

(65) Prior Publication Data

US 2017/0114842 A1    Apr. 27, 2017

(30) Foreign Application Priority Data

Oct. 21, 2015  (KR) .......................... 10-2015-0146392

(51) Int. Cl.
*F16D 48/06*  (2006.01)

(52) U.S. Cl.
CPC .... *F16D 48/06* (2013.01); *F16D 2500/10412* (2013.01); *F16D 2500/3065* (2013.01); *F16D 2500/3144* (2013.01); *F16D 2500/5126* (2013.01); *F16D 2500/7082* (2013.01)

(58) Field of Classification Search
None
See application file for complete search history.

(56) References Cited

U.S. PATENT DOCUMENTS

| 4,081,065 | A | * | 3/1978 | Smyth | B60W 10/02 477/175 |
| 5,064,036 | A | * | 11/1991 | Schneider | B60W 10/02 192/103 F |
| 5,133,326 | A | * | 7/1992 | Nishimura | F02B 33/443 123/559.3 |
| 6,780,141 | B1 | * | 8/2004 | Kao | F16H 61/00 477/164 |
| 6,991,585 | B2 | * | 1/2006 | Colvin | F16D 48/066 477/174 |
| 7,219,783 | B2 | * | 5/2007 | Stevenson | B60W 10/02 192/103 C |
| 7,770,678 | B2 | * | 8/2010 | Nozaki | B60K 6/48 180/65.6 |

(Continued)

FOREIGN PATENT DOCUMENTS

JP    2003-130198 A    5/2003
JP    2004-308841 A    11/2004
(Continued)

*Primary Examiner* — Dirk Wright
(74) *Attorney, Agent, or Firm* — Brinks Gilson & Lione

(57) ABSTRACT

A method of controlling a clutch of a vehicle, by which the clutch can be controlled to reduce jerking impacts in the case of a sudden behavior in engine torque. An amount of APS opening and engine torque are received while the vehicle is cruising using driving force from an engine. When the amount of APS opening is smaller than a first reference value, the clutch is controlled to slip by controlling clutch torque to be smaller than engine torque. After controlling the clutch slip, when the engine acts as a load while the vehicle is cruising, the clutch is engaged by application of the clutch torque to the clutch.

7 Claims, 4 Drawing Sheets

(56) References Cited

U.S. PATENT DOCUMENTS

| | | | | |
|---|---|---|---|---|
| 8,793,057 B2 * | 7/2014 | McDonnell | ........... | B60W 10/02 |
| | | | | 701/54 |
| 8,818,666 B2 * | 8/2014 | Chae | ....................... | F16H 61/04 |
| | | | | 701/67 |
| 9,108,637 B2 * | 8/2015 | Ruder | ..................... | B60K 6/383 |
| 9,670,972 B2 * | 6/2017 | Smith | ..................... | F16D 48/06 |
| 2004/0152560 A1 | 8/2004 | Kao et al. | | |

FOREIGN PATENT DOCUMENTS

| | | | | |
|---|---|---|---|---|
| JP | 2007-283878 A | 11/2007 | | |
| JP | 2012-31970 A | 2/2012 | | |
| KR | 10-0832388 | 5/2008 | | |
| KR | 10-2013-0034461 | 4/2013 | | |
| KR | 10-2013-0065412 A | 6/2013 | | |
| WO | WO-2014135831 A2 * | 9/2014 | ............. | F16D 48/06 |

* cited by examiner

METHOD OF CONTROLLING CLUTCH OF VEHICLE

CROSS REFERENCE TO RELATED APPLICATION

The present application claims priority to and the benefit of Korean Patent Application Number 10-2015-0146392, filed on Oct. 21, 2015, which is incorporated herein by reference in its entirety.

FIELD

The present disclosure relates to a method of controlling a clutch of a vehicle, by which the clutch can be controlled to reduce jerking impacts in the case of a sudden behavior in engine torque.

BACKGROUND

The statements in this section merely provide background information related to the present disclosure and may not constitute prior art.

An automated manual transmission (AMT) is a system that automatically controls a transmission based on a manual transmission mechanism. The AMT performs automatic shifting by operating shift levers in the same manner as an automatic transmission.

Since the AMT transfers engine torque using a dry clutch, an AMT vehicle has better direct connectivity compared to a vehicle having an automatic clutch using a torque converter. However, the behavior of the engine is directly transferred to the driving shaft, thereby creating jerking impacts.

When a driver suddenly operates the accelerator pedal, the resultant behavior of engine torque suddenly changes. An electronic control unit (ECU) of the engine can control the entrance of an anti-jerk control mode.

However, it is difficult to sufficiently compensate for jerking impacts using the anti-jerk control of the related art.

SUMMARY

The present disclosure proposes a method of controlling a clutch of a vehicle, and the method is able to reduce jerking impacts by controlling the clutch in the case of a sudden behavior in engine torque.

In order to achieve the above object, according to one aspect of the present disclosure, a method of controlling a clutch of a vehicle includes: receiving an amount of accelerator position sensor (APS) opening and engine torque while the vehicle is cruising using driving force from an engine; when the amount of APS opening is smaller than a first reference value, controlling the clutch slip by controlling clutch torque to be smaller than engine torque; and after controlling the clutch slip, when the engine acts as a load while the vehicle is cruising, engaging the clutch by applying the clutch torque to the clutch.

In the process of controlling the clutch slip, the clutch torque controlled to be smaller than the engine torque may be determined by the following formula:

$Tc1 = Te + \text{Delta } TQ$, and $\text{Delta } TQ = \text{Delta } TQ(-1) + F(Nm)$.

In the process of controlling the clutch slip, the clutch torque controlled to be smaller than the engine torque may be determined by the following formula:

$Tc1 = \text{MAX}\{Te + \text{Delta } TQ, E(Nm)\}$, and $\text{Delta } TQ = \text{MIN}\{\text{Delta } TQ(-1) + F(Nm), G(Nm)\}$.

The Tc1 controlled to be smaller than the Te is set to be a value which is a greater value among Te+Delta TQ value calculated by the above formula and the E(Nm) value that is set, and the Delta TQ is set be a smaller value after comparing the Delta TQ(−1)+F(Nm) calculated by the above formula with the G(Nm) that is set.

In the process of engaging the clutch, when the engine torque is smaller than 0 Nm, the clutch may be engaged.

In the process of engaging the clutch, the clutch torque controlled to be smaller than the engine torque may be determined by the following formula:

$Tc2 = \text{MIN}\{Tc2(-1) + H(Nm), Tc\_Base\}$, and $Tc\_Base = \text{MAX}\{E(Nm), Te\_mirror\}$.

The Tc2 applied for engagement of the clutch is set to be a value which is a smaller value among the Tc2(−1)+H(Nm) and the Tc_Base, and the Tc_Base is determined to be a greater value among the E(Nm) value that is set and the Te_mirror value.

After the process of controlling the clutch slip or after the process of engaging the clutch, when the amount of APS opening is greater than a second reference value or when a period of time, during which the amount of APS opening is equal to or smaller than the second reference value and a difference between a speed of revolution of the engine and a speed of revolution of the clutch exceeds a reference number of revolutions, continues for a reference time or longer, the process of engaging the clutch may be canceled.

The amount of APS opening and the engine torque may be input via a controller. The clutch may be actuated using a clutch actuator which may be controlled by the controller.

According to the present disclosure, when a sudden behavior in engine torque, such as a tip out, occurs while the vehicle is driving using driving force from the engine, the clutch is slip-controlled, whereby the clutch absorbs jerking impacts in response to a sudden change in torque transferred from the engine. It is therefore possible to improve driving comfort, improve the quality of the vehicle, and improve the overall durability of the transmission by reducing impacts.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
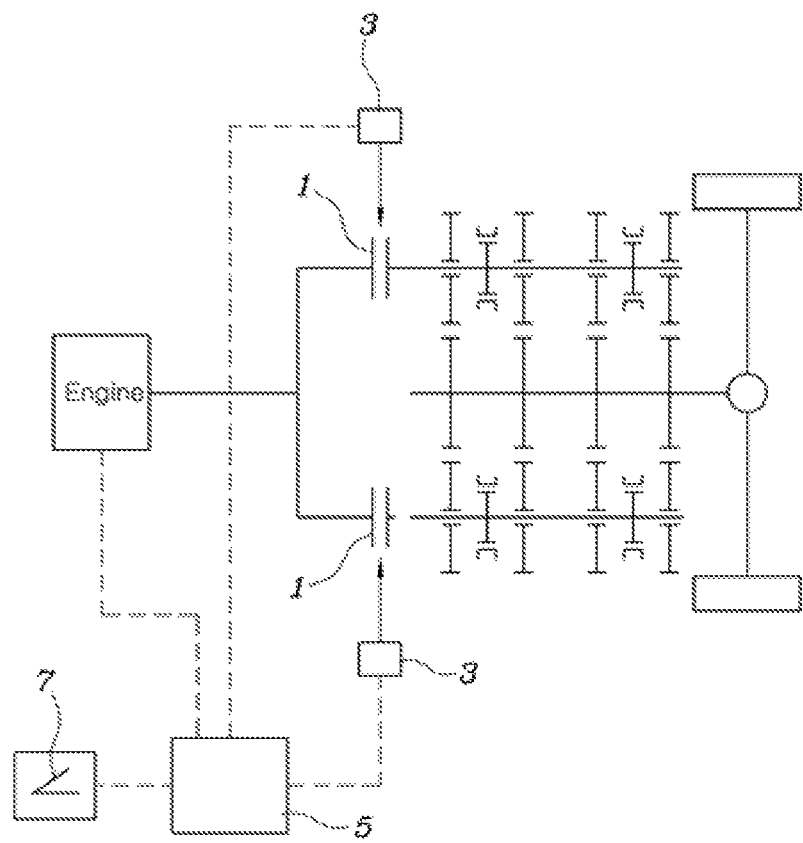
FIG. 1 is a schematic diagram illustrating the overall layout of a vehicle system on which a DCT is mounted.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A method of controlling a clutch of a vehicle according to the present disclosure generally includes input step S10, a slip step S20, and clutch engagement step S30.

The present disclosure will be described in detail with reference to FIGS. 1 to 3. First, at the input step S10, while the vehicle is cruising using driving force from an engine, a controller 5 determines whether or not to enter an anti-jerk mode by receiving an amount of APS opening and an engine torque.

In the slip step S20, when the amount of APS opening is smaller than a first reference value A, the controller 5 can control a clutch actuator 3 to output a clutch torque smaller than the engine torque by applying an operation signal to the clutch actuator 3, thereby controlling a clutch slip.

For example, in tip-out driving in which a driver suddenly steps off a foot from an accelerator pedal in a cruising position in which the vehicle is cruising using driving force from the engine in response to the driver pressing the accelerator pedal 7, the clutch torque is controlled to be smaller than the engine torque.

Subsequently, in clutch engagement step S30, after the slip step S20, when the engine acts as a load in the cruising position of the vehicle, it is possible to control the clutch 1 to engage by applying the clutch torque to the clutch 1 via the clutch actuator 3.

For example, when the engine torque is less than 0 Nm, the clutch 1 can be controlled to engage. More specifically, when the engine of the vehicle is reversed due to rotational force reversely-input into the engine from the wheel sides, i.e. in a change in driving in which engine torque is changed into drag torque, the clutch 1 is engaged such that the slip of the clutch 1 is reduced or inhibited.

In this case, the clutch 1 that is controlled to slip and engage may be a driving shaft clutch in a DCT vehicle.

According to the present disclosure, when a sudden behavior in engine torque, such as a tip-out, occurs while the vehicle is cruising using driving force from the engine, the clutch 1 is controlled to slip, such that a jerking impact caused by a sudden change in torque transferred from the engine is absorbed by the clutch. This can consequently improve driving comfort, improve the quality of the vehicle, and improve the overall durability of the transmission by reducing impacts.

Figure 2:
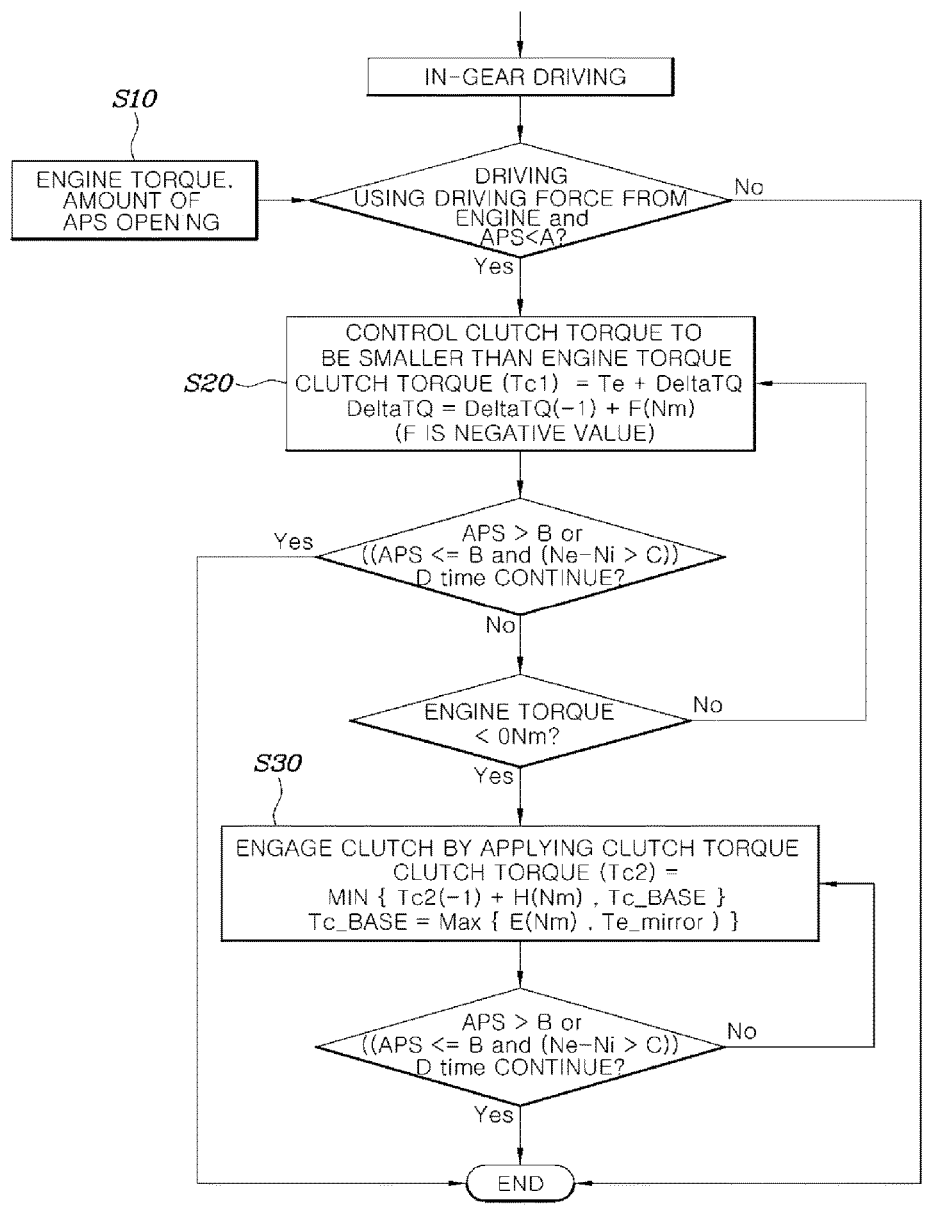
FIG. 2 is a flowchart illustrating a control flow according to a first embodiment of a method of controlling a clutch of a vehicle according to the present disclosure.
Figure 3:
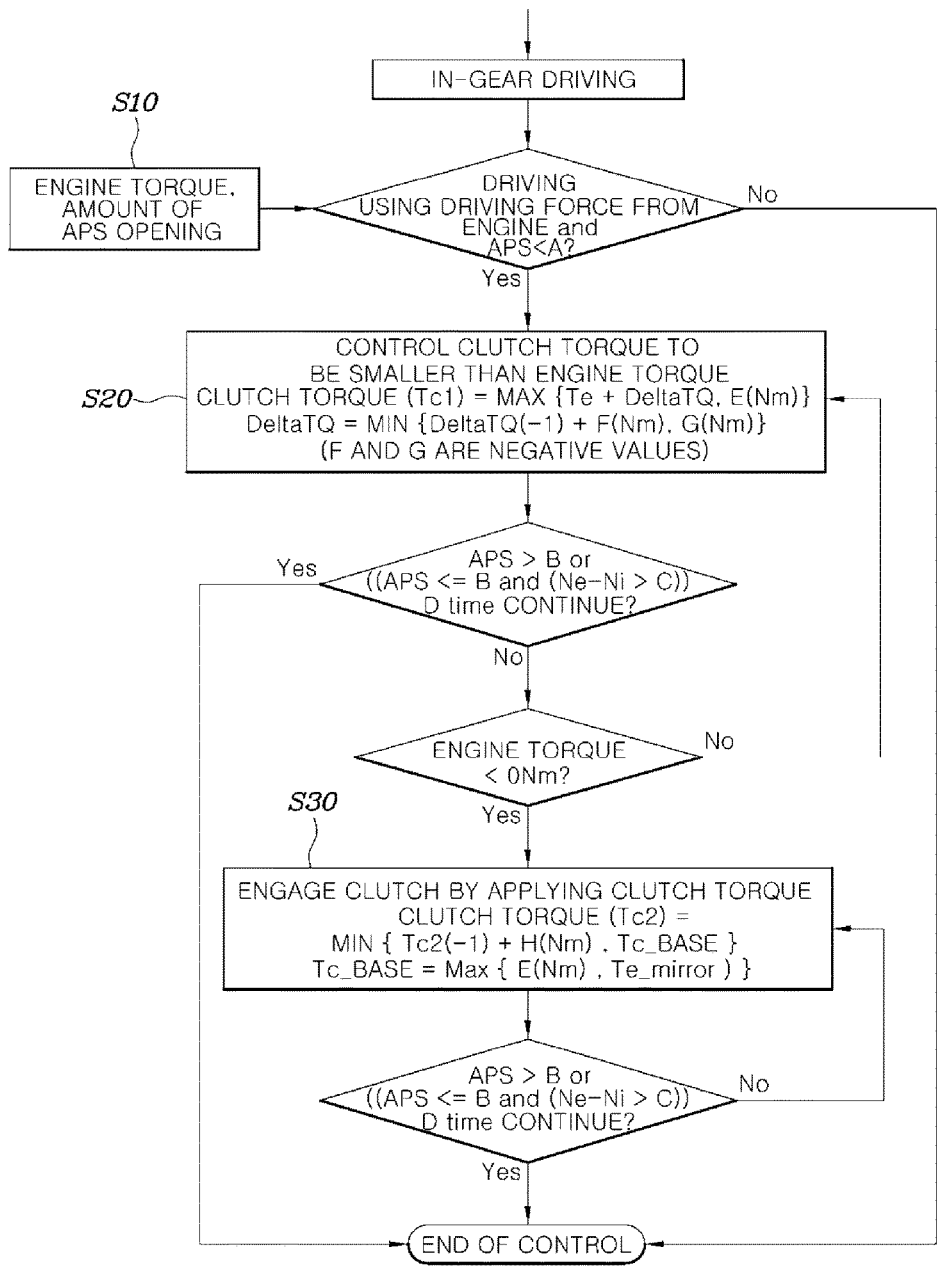
FIG. 3 is a flowchart illustrating a control flow according to a second embodiment of the method of controlling a clutch of a vehicle according to the present disclosure.

Referring to FIGS. 2 and 3, according to a first embodiment of the slip step S20, clutch torque Tc1 controlled to be smaller than engine torque Te can be determined by the following formula:

$$Tc1 = Te + \text{Delta } TQ$$

$$\text{Delta } TQ = \text{Delta } TQ(-1) + F(Nm)$$

In the formula above,

Tc1 indicates the clutch torque controlled to be smaller than the engine torque, Te indicates the engine torque, Delta TQ indicates an amount of a change in torque with respect to the engine torque, Delta TQ(−1) indicates an amount of a change in torque with respect to the engine torque calculated by a control cycle right before an F value is reflected, and F(Nm) indicates an amount of a change in torque with respect to the engine torque during a single control cycle (where F is a negative value).

Since initial Delta TQ of each engine is previously set, Delta TQ is calculated by repeating a control cycle of adding F(Nm), i.e. an amount of a change in torque during a single control cycle intended to control the clutch actuator 3, to initial Delta TQ, and subsequently adding F(Nm), i.e. an amount of a change in torque during the next single control cycle, to added previous Delta TQ(−1).

Since F(Nm) is a negative value, the value of Delta TQ may be a value increasing in the negative direction. Consequently, Tc1 calculated by adding Delta TQ to Te may become a value smaller than Te. Thus, it is possible to reduce a jerking impact in response to a sudden behavior in engine torque while an engine load is being transferred to the vehicle by properly controlling the clutch slip by controlling clutch torque Tc1.

Figure 4:
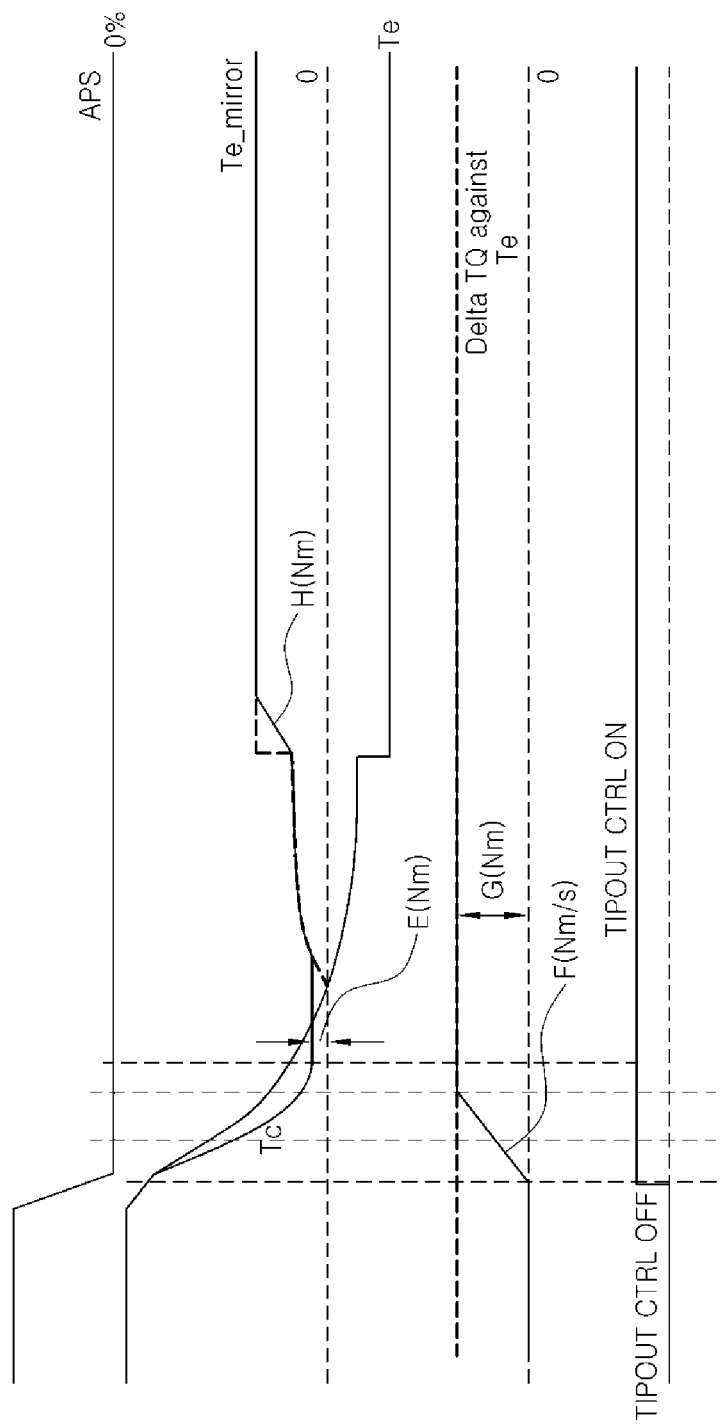
FIG. 4 is a diagram illustrating the behaviors of engine torque and clutch torque when entering an anti-jerk mode by the method of controlling a clutch of a vehicle according to the present disclosure.

In addition, referring to FIGS. 3 and 4, according to a second embodiment of the slip step S20, clutch torque Tc1 controlled to be smaller than engine torque Te can be determined by the following formula:

$$Tc1 = \text{MAX}\{Te + \text{Delta } TQ, E(Nm)\}$$

$$\text{Delta } TQ = \text{MIN}\{\text{Delta } TQ(-1) + F(Nm), G(Nm)\}$$

In the formula above,

Tc1 indicates the clutch torque controlled to be smaller than the engine torque, Te indicates the engine torque, E(Nm) indicates a minimum amount of clutch torque set to be smaller than engine torque, by which driving force from the engine can be transferred to the transmission while a slip is caused, Delta TQ indicates an amount of a change in torque with respect to the engine torque, Delta TQ(−1) indicates an amount of a change in torque with respect to the engine torque calculated by a control cycle right before an F value is reflected, F(Nm) indicates an amount of a change in torque with respect to the engine torque during a single control cycle (where F is a negative value), and G(Nm) indicates an amount of a change in torque with respect to engine torque set to leave a minimum amount of clutch torque such that driving force from the engine can be transferred to the transmission (where G is a negative value).

According to the formula in the second embodiment, clutch torque Tc1 controlled to be smaller than engine torque Te may be determined to be a greater value among Te+Delta TQ value calculated by the above formula and E(Nm) value that is set. In addition, Delta TQ may be determined to be a smaller value after comparing Delta TQ(−1)+F(Nm) value calculated by the above formula with G(Nm) value that is set.

Thus, it is possible to reduce a jerking impact in response to a sudden behavior in engine torque while an engine load is being transferred to the vehicle by properly controlling the clutch 1 to slip by controlling clutch torque Tc1.

In addition, referring to FIGS. 2 to 4, in clutch engagement step S30 according to the present disclosure, clutch torque Tc2 applied for engagement of the clutch 1 may be determined by the following formula:

$$Tc2 = \text{MIN}\{Tc2(-1) + H(Nm), Tc\_Base\}$$

$$Tc\_Base = \text{MAX}\{E(Nm), Te\_mirror\}$$

In the formula above,

Tc2 indicates clutch torque applied for engagement of the clutch,

Tc2(−1) indicates clutch torque calculated in a control cycle before calculation of Tc2, H(Nm) indicates an amount of a change in clutch torque with respect to a single control cycle that changes along a predetermined gradient when engine torque suddenly decreases, E(Nm) indicates a minimum amount of clutch torque set to be smaller than engine torque, by which driving force from the engine can be transferred to the transmission while a slip is caused, and Te_mirror indicates an absolute value of engine torque.

According to the above formula, clutch torque (Tc2) applied for engagement of the clutch 1 may be determined to be a smaller value among Tc2(−1)+H(Nm) value and Tc_Base value. In addition, Tc_Base may be a value which is greater among E(Nm) value that is set and Te_mirror value.

For example, when the vehicle is driving without the accelerator pedal 7 being pressed after the slip step S20, engine torque Te gradually decreases to a value smaller than 0 Nm, in which the engine acts as a load to the vehicle. In this case, Tc_Base torque is set to a value which is greater among a value of torque which corresponds to the absolute value of engine torque Te, and arbitrarily-set clutch torque E(Nm) value.

Afterwards, clutch torque Tc2 for engagement of the clutch 1 is determined by selecting a smaller value among a Tc_Base value and a value of Tc2(−1)+H(Nm).

In this case, clutch torque before clutch engagement step S30 may be used as an initial value of clutch torque Tc2(−1). In a driving mode such as engine fuel cut, H(Nm) may be added to clutch torque Tc2(−1).

When engine torque Te suddenly decreases as in the case of engine fuel cut, H(Nm) is added such that clutch torque Tc2 gradually follows the absolute value of engine torque Te. At this time, the gradient may be set to a maximum gradient that does not cause a jerking impact in response to a sudden decrease in engine torque Te to be transferred to the vehicle. The maximum gradient can be determined empirically.

After the slip step S20 or the clutch engagement step S30, it may be determined whether or not to cancel the anti-jerk mode. For example, when the amount of APS opening exceeds a second reference value B, the slip control over the clutch 1 in the slip step S20 may be canceled and the engagement control over the clutch 1 in the clutch engagement step S30 may be canceled.

In addition, after slip step S20 or the clutch engagement step S30, when a period of time, during which the amount of APS opening is equal to or smaller than the second reference value B and the difference between the speed of the revolution of the engine and the speed of the revolution of the clutch exceeds a reference number of revolutions C, continues for a reference time D or longer, the slip control over the clutch in the slip step S20 may be canceled and the engagement control over the clutch in the clutch engagement step S30 may be canceled.

In one form, the second reference value B, based on which the amount of APS opening is determined, is a predetermined amount of APS opening that is slightly greater than 0%, which is the amount of APS opening at which the accelerator pedal 7 is tipped out. The second reference value B may vary depending on conditions in which the vehicle is cruising.

In addition, the reference number of revolutions C may be determined based on the amount of the slip of the clutch at a point at which the clutch is almost engaged. The point corresponds to a time which is just before the speed of the rotation of the engine which gradually increases according to increase of the amount of APS opening is synchronized with the speed of the rotation of the clutch.

Hereinafter, a control flow of the method of controlling a clutch according to the present disclosure will be described with reference to FIGS. 2 and 3.

First, in a cruising condition in which the vehicle in an in-geared position is cruising using driving force from the engine, the controller 5 determines whether or not the accelerator pedal 7 is suddenly tipped out based on the amount of APS opening input thereto, and determines whether or not to enter an anti-jerk mode in response to the tip-out operation.

When the accelerator pedal 7 is determined to be tipped out, clutch 1 is controlled to slip by controlling clutch torque Tc1 to be smaller than engine torque Te, whereby a jerking impact in response to a sudden behavior of engine torque Te is absorbed by the clutch 1.

During the slip control over the clutch 1, whether or not to cancel the anti-jerk mode is determined by receiving the amount of APS opening, the number of revolutions of the engine, and the number of revolutions of the clutch. When conditions for canceling the anti-jerk mode are satisfied, the slip control over the clutch 1 is terminated immediately.

In addition, when conditions for canceling the anti-jerk mode are unsatisfied, it is determined whether or not the engine acts as a load during the driving of the vehicle by decreasing engine torque Te to be smaller than 0 Nm while maintaining the clutch 1 in the slip mode.

When engine torque Te is decreased to be smaller than 0 Nm, clutch torque Tc2 is applied to the clutch 1 such that the clutch 1 is engaged. In this manner, the clutch 1 is controlled to overcome the slip of the clutch 1.

Furthermore, during the engagement control over the clutch 1, whether or not to cancel the anti-jerk mode is determined based on the amount of APS opening, the number of revolutions of the engine, and the number of revolutions of the clutch that are input. When conditions for canceling the anti-jerk mode are satisfied, the engagement control over the clutch is terminated immediately.

As set forth above, when a sudden behavior in engine torque T3, such as a tip out, occurs while the vehicle is driving using driving force from the engine, the clutch is slip-controlled, whereby the clutch 1 absorbs jerking impacts in response to a sudden change in torque transferred from the engine. It is therefore possible to improve driving comfort, improve the quality of the vehicle, and improve the overall durability of the transmission by reducing impacts.

Although the exemplary embodiments of the present disclosure have been described for illustrative purposes, a person skilled in the art will appreciate that various modifications, additions and substitutions are possible, without departing from the scope and spirit of the present disclosure.

The invention claimed is:

1. A method of controlling a clutch of a vehicle, comprising:
   receiving an amount of APS opening and engine torque while the vehicle is cruising using driving force from an engine;

when the amount of APS opening is smaller than a first reference value, controlling a clutch slip by controlling a clutch torque to be smaller than an engine torque; and after controlling the clutch slip, when the engine acts as a load while the vehicle is cruising, engaging the clutch by applying the clutch torque to the clutch.

2. The method according to claim 1, wherein, in the process of controlling the clutch slip, the clutch torque controlled to be smaller than the engine torque is determined by the following formula:

$$Tc1 = Te + \text{Delta } TQ$$

$$\text{Delta } TQ = \text{Delta } TQ(-1) + F(Nm), \text{ where}$$

Tc1 indicates the clutch torque controlled to be smaller than the engine torque, Te indicates the engine torque, Delta TQ indicates an amount of a change in torque with respect to the engine torque, Delta TQ(−1) indicates an amount of a change in torque with respect to the engine torque calculated by a control cycle right before an F value is reflected, and F(Nm) indicates an amount of a change in torque with respect to the engine torque during a single control cycle, where F is a negative value.

3. The method according to claim 1, wherein, in the process of controlling the clutch slip, the clutch torque controlled to be smaller than the engine torque is determined by the following formula:

$$Tc1 = \text{MAX}\{Te + \text{Delta } TQ, E(Nm)\}$$

$$\text{Delta } TQ = \text{MIN}\{\text{Delta } TQ(-1) + F(Nm), G(Nm)\},$$
where

Tc1 indicates the clutch torque controlled to be smaller than the engine torque, Te indicates the engine torque, E(Nm) indicates a minimum amount of clutch torque set to be smaller than engine torque, by which driving force from the engine is transferred to a transmission while a slip is caused, Delta TQ indicates an amount of a change in torque with respect to the engine torque, Delta TQ(−1) indicates an amount of a change in torque with respect to the engine torque calculated by a control cycle right before an F value is reflected, F(Nm) indicates an amount of a change in torque with respect to the engine torque during a single control cycle, where F is a negative value, and G(Nm) indicates an amount of a change in torque with respect to an engine torque set to leave a minimum amount of clutch torque such that driving force from the engine is transferred to the transmission, where G is a negative value, wherein the Tc1 controlled to be smaller than the Te is determined to be a greater value among Te+Delta TQ value calculated by the above formula and the E(Nm) value that is set, the Delta TQ is determined to be a smaller value among the Delta TQ(−1)+F(Nm) value calculated by the above formula and the G(Nm) value that is set.

4. The method according to claim 1, wherein, when the engine torque is smaller than 0 Nm, the clutch is engaged.

5. The method according to claim 1, wherein, in the process of engaging the clutch, the clutch torque controlled to be smaller than the engine torque is determined by the following formula:

$$Tc2 = \text{MIN}\{Tc2(-1) + H(Nm), Tc\_Base\}$$

$$Tc\_Base = \text{MAX}\{E(Nm), Te\_mirror\}, \text{ where}$$

Tc2 indicates a clutch torque applied for engagement of the clutch,

Tc2(−1) indicates clutch torque calculated in a control cycle before calculation of Tc2, H(Nm) indicates an amount of a change in clutch torque with respect to a single control cycle that changes along a predetermined gradient when engine torque suddenly decreases, E(Nm) indicates a minimum amount of clutch torque set to be smaller than engine torque, by which driving force from the engine is transferred to the transmission while a slip is caused, and Te_mirror indicates an absolute value of engine torque, wherein the Tc2 applied for engagement of the clutch is determined to be a value which is a smaller value among the Tc2(−1)+H(Nm) value and the Tc_Base value, and the Tc_Base value is set to a value which is a greater value among the E(Nm) value that is set and the Te_mirror value.

6. The method according to claim 1, wherein, after the process of controlling the clutch slip or after the process of engaging the clutch, when the amount of APS opening is greater than a second reference value or when a period of time, during which the amount of APS opening is equal to or smaller than the second reference value and a difference between a speed of revolution of the engine and a speed of revolution of the clutch exceeds a reference number of revolutions, continues for a reference time or longer, the process of engaging the clutch is canceled.

7. The method according to claim 1, wherein
the amount of APS opening and the engine torque are input via a controller,
the clutch is actuated using a clutch actuator, and
the clutch actuator is controlled by the controller.

* * * * *